(12) United States Patent
Hansen et al.

(10) Patent No.: US 7,480,294 B1
(45) Date of Patent: Jan. 20, 2009

(54) NETWORK RESOURCE ALLOCATION

(75) Inventors: Kevin Harry Hansen, Shawnee, KS (US); Walt Weber, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 586 days.

(21) Appl. No.: 11/119,713

(22) Filed: May 2, 2005

(51) Int. Cl.
*H04J 3/18* (2006.01)

(52) U.S. Cl. .................................. 370/389; 370/477

(58) Field of Classification Search ................. 370/389, 370/400, 352, 356, 465, 477
See application file for complete search history.

(56) References Cited

U.S. PATENT DOCUMENTS

| | | | | |
|---|---|---|---|---|
| 5,781,624 A | * | 7/1998 | Mitra et al. | 379/244 |
| 5,978,465 A | * | 11/1999 | Corduroy et al. | 379/265.02 |
| 6,201,971 B1 | * | 3/2001 | Purnadi et al. | 455/450 |
| 7,002,919 B1 | * | 2/2006 | El-Sayed | 370/252 |
| 7,106,756 B1 | * | 9/2006 | Donovan et al. | 370/468 |
| 2004/0248583 A1 | * | 12/2004 | Satt et al. | 455/452.2 |
| 2006/0083244 A1 | * | 4/2006 | Jagadesan et al. | 370/395.2 |

OTHER PUBLICATIONS

"2: CS 2000CS 2000Functional description (FN)" OPTDDOC FN section content last updated in OPTDDOC.aa04, CS 2000CS 2000Functional description (FN) A00002739.AA15, pp. 33-42.

* cited by examiner

*Primary Examiner*—Chirag G Shah
*Assistant Examiner*—Minh-Trang Nguyen (57) ABSTRACT

A method of operating a communication system for providing packet services, the method comprising receiving a session setup request for a session, processing the session setup request to select an end point for the session, determining a first resource group of a plurality of resource groups associated with the end point, determining a first profile of a plurality of profiles of the resource group, determining if the session will violate the first profile, and generating an authorization message for the session in response to determining that the session will not violate the first profile.

15 Claims, 9 Drawing Sheets

| RESOURCE GROUP | COMMONALITY | MEMBERS |
|---|---|---|
| A | LINK 1 | EP 141 |
| B | LINK 2 | EP 142 |
| C | LINK 3 | EP 141, EP 142 |
| D | LINK 4 | EP 143 |
| E | LINK 5 | EP 144 |
| F | LINK 6 | EP 141, EP 142, EP 143, EP 144 |

NETWORK RESOURCE ALLOCATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

An embodiment of the invention relates to telecommunications, and in particular, to methods, systems, and software for allocating network resources in packet networks.

2. Description of the Prior Art

In circuit switched telecommunication networks, line and trunk circuits have a dedicated amount of bandwidth. When a switch selects a line for a call, it is implied that the line has enough bandwidth for the call if the line is available. If the line is not available, the switch is typically prohibited from setting up the call. In this manner, a situation in which a switch continues to set up new calls when the network does not have adequate resources is unlikely to occur.

In contrast, packet switched telecommunication networks do not have lines or trunks with dedicated amounts of bandwidth. Rather, packet switched networks route calls over links with variable amounts of bandwidth. In addition to link bandwidth, other devices, such as routers or gateways, might have bandwidth limits that constrain network operations. Furthermore, the bandwidth of each individual call in a packet switched network could vary. For example, a call using a G.711 Coder/Decoder (codec) uses up to eight times as much bandwidth as a call using a G.729 codec. Thus, it has become a common problem in packet switched networks that new calls are setup when the network does not have adequate resources to handle the new calls.

SUMMARY OF THE INVENTION

An embodiment of the invention helps solve the above problems and other problems by providing methods, systems, and software for better allocating network resources in a communication network. In an embodiment of the invention, a method of operating a communication system for providing packet services involves the steps of receiving a session setup request for a session, processing the session setup request to select an end point for the session, determining a first resource group of a plurality of resource groups associated with the end point, determining a first profile of a plurality of profiles of the resource group, determining if the session will violate the first profile, and generating an authorization message for the session in response to determining that the session will not violate the first profile.

An embodiment of the invention includes rejecting the session if the session will violate the first profile.

An embodiment of the invention includes transmitting the authorization message to the end point.

An embodiment of the invention includes determining a second profile of the plurality of profiles of the first resource group in response to determining that the session will violate the first profile.

An embodiment of the invention includes completing session setup for the session in response to determining that the session will not violate the second profile.

In an embodiment of the invention, the plurality of resource groups comprise a plurality of links in a packet switched network.

An embodiment of the invention, determining if the session will violate the first profile comprises determining if adding the session to the first resource group will exceed a first number of sessions allocated for a first codec type within the first profile wherein the first codec type is associated with the end point.

An embodiment of the invention, determining if the session will violate the first profile comprises determining a first codec type associated with the end point, assigning a first weight to the first codec type, and determining if the sum of the first weight and at least a current weight for the first profile exceeds a total weight allowed for the first profile.

BRIEF DESCRIPTION OF THE DRAWINGS

The same reference number represents the same element on all drawings.

DETAILED DESCRIPTION OF THE PREFERRED EMBODIMENT

FIGS. 1-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
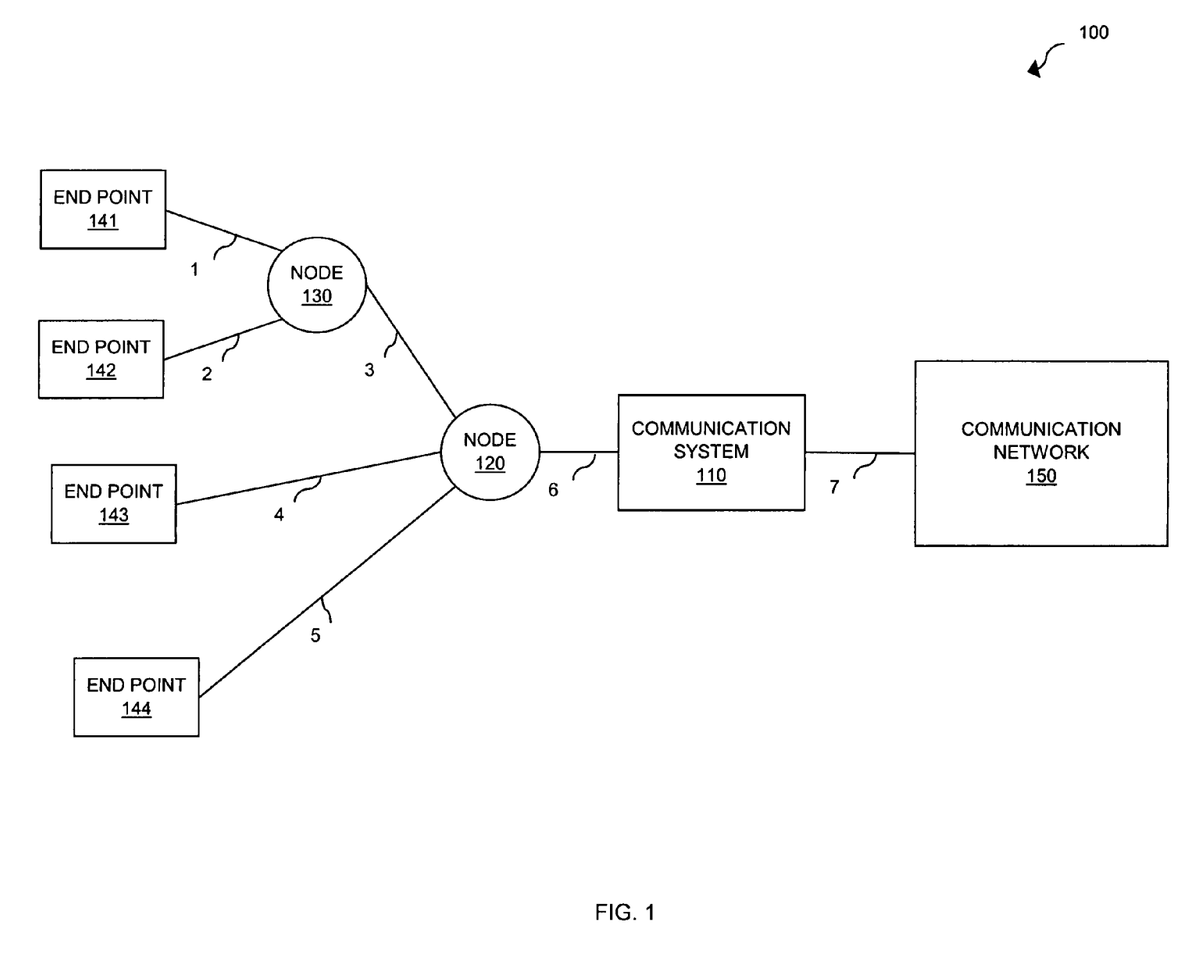
FIG. 1 illustrates a communication network in an embodiment of the invention.
Figure 2:
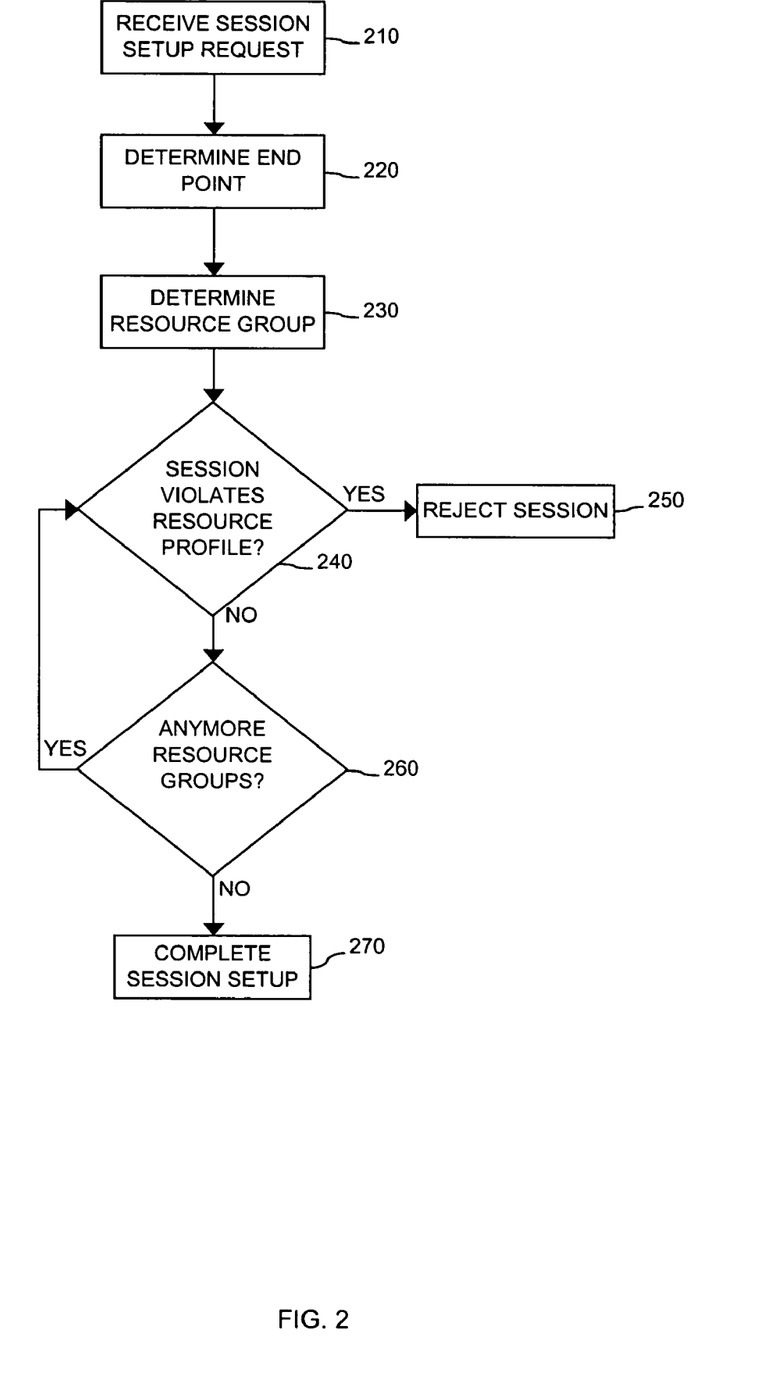
FIG. 2 illustrates the operation of a communication network in an embodiment of the invention.
Figure 3:
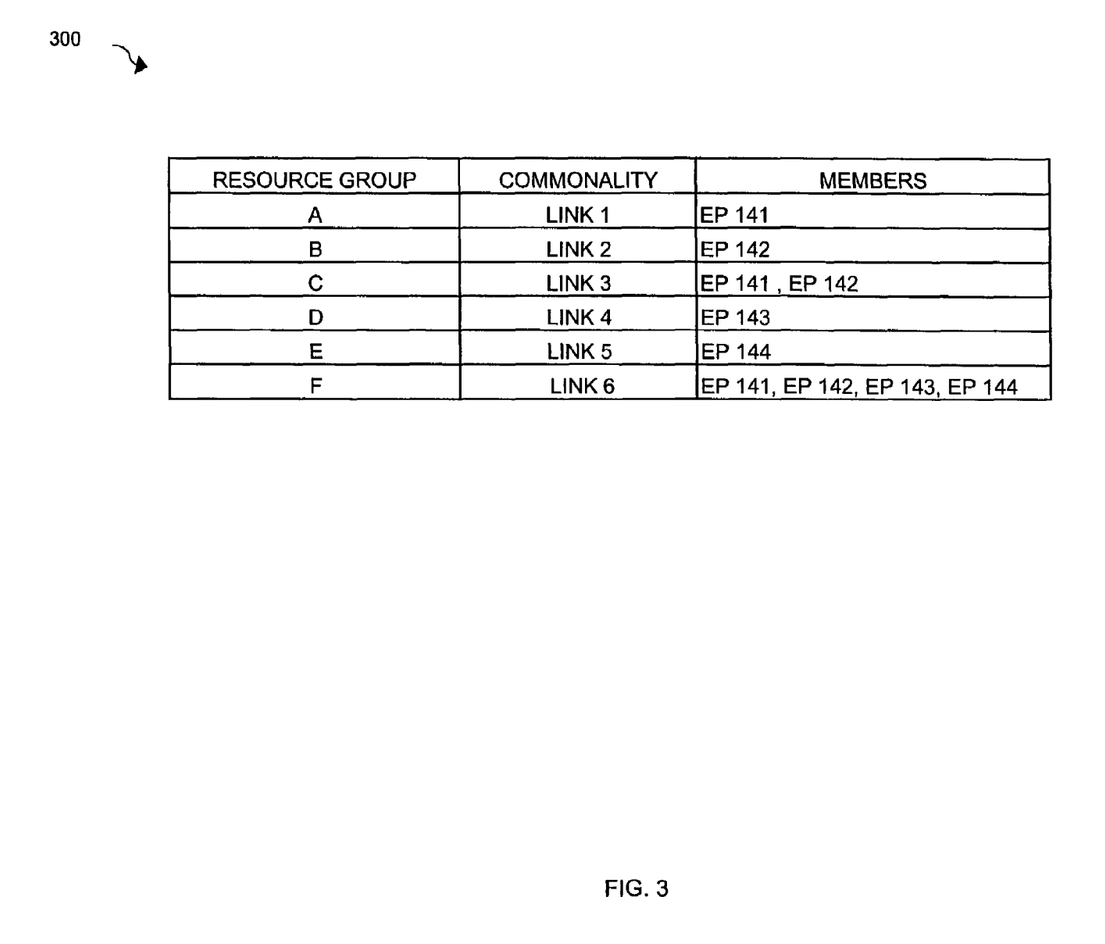
FIG. 3 illustrates a table in an embodiment of the invention.

FIGS. 1-3

FIG. 1 illustrates communication network 100 in an embodiment of the invention. Communication network 100 includes communication system 110 in communication with communication network 150 over link 7. Communication system 110 is also in communication with node 120 over link 6. Node 120 is in communication with node 130 over link 3.

Node 120 is also in communication with end point 144 over link 5, and end point 143 over link 4. Node 130 is in communication with end point 141 over link 1, and with end point 142 over link 2.

In this embodiment, communications are transferred to and from the various end points to communication system 110. Similarly, communications are transferred to and from communication network 150 to communication system 110. Communication network 150 could be, for example, a packet based communication network, such as an Internet or intranet. Communication network 150 could also be, for example, a circuit switched network, such as the public switched telephone network (PSTN). Communication network 150 could also be a wireless communication network.

Further in this embodiment, communication system 110 could be any communication system capable of handling communication sessions between elements of communication network 150 and end points 141-144. End points 141-144 could be, for example, user devices, customer premise equipment, soft switches, or proxy servers, as well as other types of network end points. Nodes 120 and 130 could be network elements, such as routers, that handle session traffic between the various end points and communication system 110.

In this embodiment, communication system 110 manages sessions between the various end points and each other, as well as with communication network 150. For instance, communication system 110 sets up voice or video sessions for the end points. In addition, communication system 110 could interwork session traffic between various formats and protocols required by the end points and communication network 150.

FIG. 2 illustrates the operation of communication network 100 in an embodiment of the invention. To begin, communication system 110 receives a session setup request (Step 210). Such a request could be in the form of a session initiation protocol (SIP) message or an H.323 setup message, as well as in other forms. Based on the request message, communication system 110 determines an end point for the session (Step 220).

The end point could be determined from end points 141-144. Next, communication system 110 determines a resource group associated with the selected end point (Step 230).

Any particular end point could be associated with one or more resource groups. A resource group is a collection of one or more network resources to be managed or allocated based upon a shared identity or commonality. For example, elements of a resource group could be related by connectivity. A network element could be a hardware component, such as a router or soft switch, as well as a link. Each resource group could have one or more profiles. A profile describes the constraints of the resource group and how the constraints should be applied to the resource group.

Upon determining the resource group, communication system 110 access the current profile for that resource group. Upon accessing the profile, communication system 110 determines whether or not the requested session would violate the resource profile if the session were to be setup (Step 240). If yes, the session is rejected (Step 250). If not, communication system 110 further processes the request message to determine if there are anymore resource groups associated with the end point (Step 260). If so, Step 240 is repeated for the next resource group and its current profile. If not, the session setup process is completed (Step 270). The above illustrated steps could be performed in a different order than that described.

FIG. 3 is an illustration of a resource table 300 used by communication system 110 is the above described processes. Table 300 has three columns. The first column indicates the name of the resource group. The second column illustrates the commonality that provides the relationship between the elements of the resource group. The third column illustrates the elements of the resource group.

In FIG. 3, the resource groups are allocated elements based upon their common connectivity to a node. For example, resource group A includes end point 141 related to link 1 because link 1 connects end point 141 to node 130. In contrast, resource group C has two members—end point 141 and end point 142—included because of their common relationship to link 3, which provides both end points with connectivity to node 120. Resource group F has four members in its resource group—end point 141, end point 142, end point 143, and end point 144—based on their common relationship to link 6, which provides connectivity to communication system 110.

A profile is then created for each resource group A-F. The profile holds the constraints to be applied to the members of the resource groups. For example, the profile for resource group A could indicate a constraint, such as maximum bandwidth, associated with link 1. Adding end point 141 is only allowed so long as the resulting bandwidth does not exceed the maximum bandwidth allowed for link 1. This could occur if, for instance, end point 141 is a high-bandwidth device and if the requested service requires a high bandwidth. In that case, the requested service could be rejected.

In another example, the profile for resource group C could indicate a maximum bandwidth constraint to be applied to link 3. End points 141 and 142 are part of resource group C. End point 141 is also part of resource group A. Thus, the constraints of two profiles for both resource groups must be satisfied in order to allow a service request that implicates both resource groups.

In an illustrative example, assume a session request is received by communication system 110 for a voice over packet (VoP) session between end point 141 and a user device in communication network 150. Further assume that communication network 150 is the PSTN. In this example, communication system 110 processes a session request 110 to select end point 141. Communication system 110 would then access table 300 to determine any resource groups associated with end point 141. In this example, end point 141 is associated with resource groups A, C, and F.

Next, communication system 110 determines if the requested session would violate a profile for resource group A. Assuming the session would not violate the profile for resource group A, communication system 110 then determines whether the session would violate the resource group for resource group C. Again, assuming the session would not violate the profile for resource group C, communication system 110 then determines whether or not the session would violate the profile for resource group F. If the session would violate the profile for any of the resource groups, the session could be rejected. The profiles could, for example, set a maximum number of calls that can be handled by any one resource group at a given time.

Assuming again that the session would not violate any of the profiles for the various resource groups, the session setup would continue. Once the session is completely setup, session traffic can be transferred to and from end point 141 and communication network 150. In this example, communication system 110 would interwork the traffic between an asynchronous packet format and a synchronous format for communication network 150. Communication system 110 could also include link 7 in determining if the session should be setup. However, in this example, communication network 150 is the PSTN. Link 7 would therefore likely be a synchronous trunk line. Thus, if the trunk is available, then it can be assumed that the bandwidth profile for the trunk would not be exceeded by the session.

Advantageously, communication network 100 provides an improved way to allocate network resources. In contrast to the prior art, the individual bandwidth requirements of various links and devices involved in a session can be accounted for prior to setting up a session. In this manner, quality of service requirements can be enforced without the risk of service degradation or cessation. Furthermore, the concept of resource groups and resource profiles provides a flexible and efficient mechanism for managing network resources.

Second Embodiment Configuration and Operation

FIGS. 4-7

Figure 4:
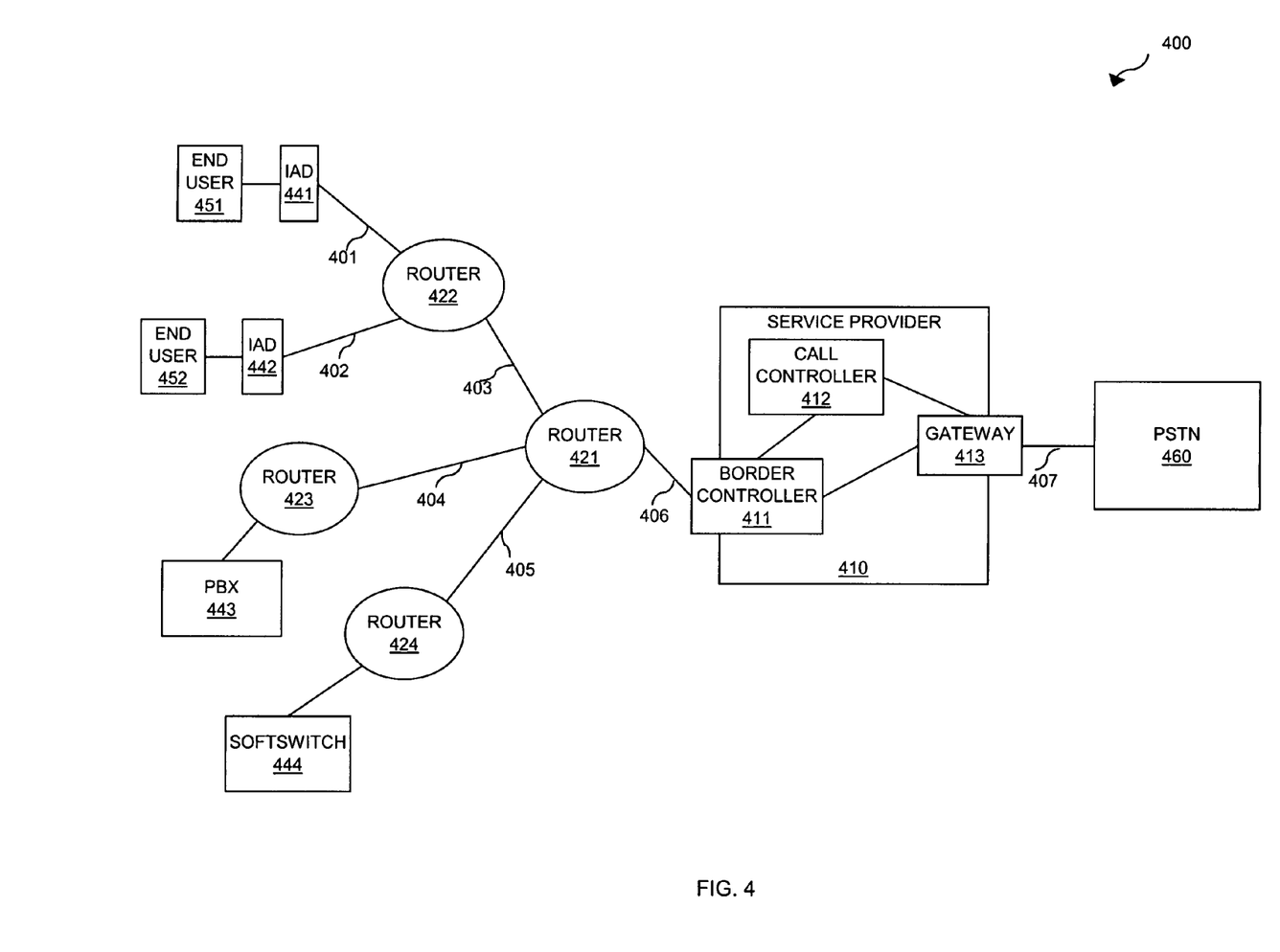
FIG. 4 illustrates a communication network in an embodiment of the invention.

FIG. 4 illustrates communication network 400 in an embodiment of the invention. Communication network 400 includes service provider 410 in communication with PSTN 460. Service provider 410 includes call controller 412, border controller 411, and gateway 413. Call controller could also be referred to as a gateway controller. Gateway 413 interworks asynchronous packet traffic to and from a synchronous format for PSTN 460. The traffic is exchanged over link 407. Border controller 411 is in communication with router 421 over link 406. Router 421 is in communication with intermediate access device (IAD) 441 through router 422 and via links 401 and 403. Similarly, router 421 is in communication with private branch exchange (PBX) 443 through router 423 via link 404. Router 521 is also in communication with soft switch 444 through router 424 and via link 405. Lastly, router 421 is in communication with IAD 442 through router 422 and via links 402 and 403.

In operation, service provider 410 provides services to end users 451 and 452. In addition, service provider 410 provides services to end users (not pictured for the sake of clarity) of PBX 443 and soft switch 444. Services could be, for example, voice or video over packet (VoP) services. In addition, services could be, for example, data services, as well as other types of services.

Further in operation, the various links 401-406 are capable of providing a finite amount of bandwidth for traffic. Similarly, routers 421-424 are also capable of providing a finite amount of bandwidth. Soft switch 444 can also only handle a certain amount of traffic, and therefore can have an associated bandwidth. PBX 443 also typically can handle only a certain number of simultaneous calls. End users 451 and 452 typically utilize particular codec schemes, and therefore use a certain amount of bandwidth per call. As such, it is important that service provider 410 allocate and manage the bandwidth associated with all the various network elements and links.

Figure 5:
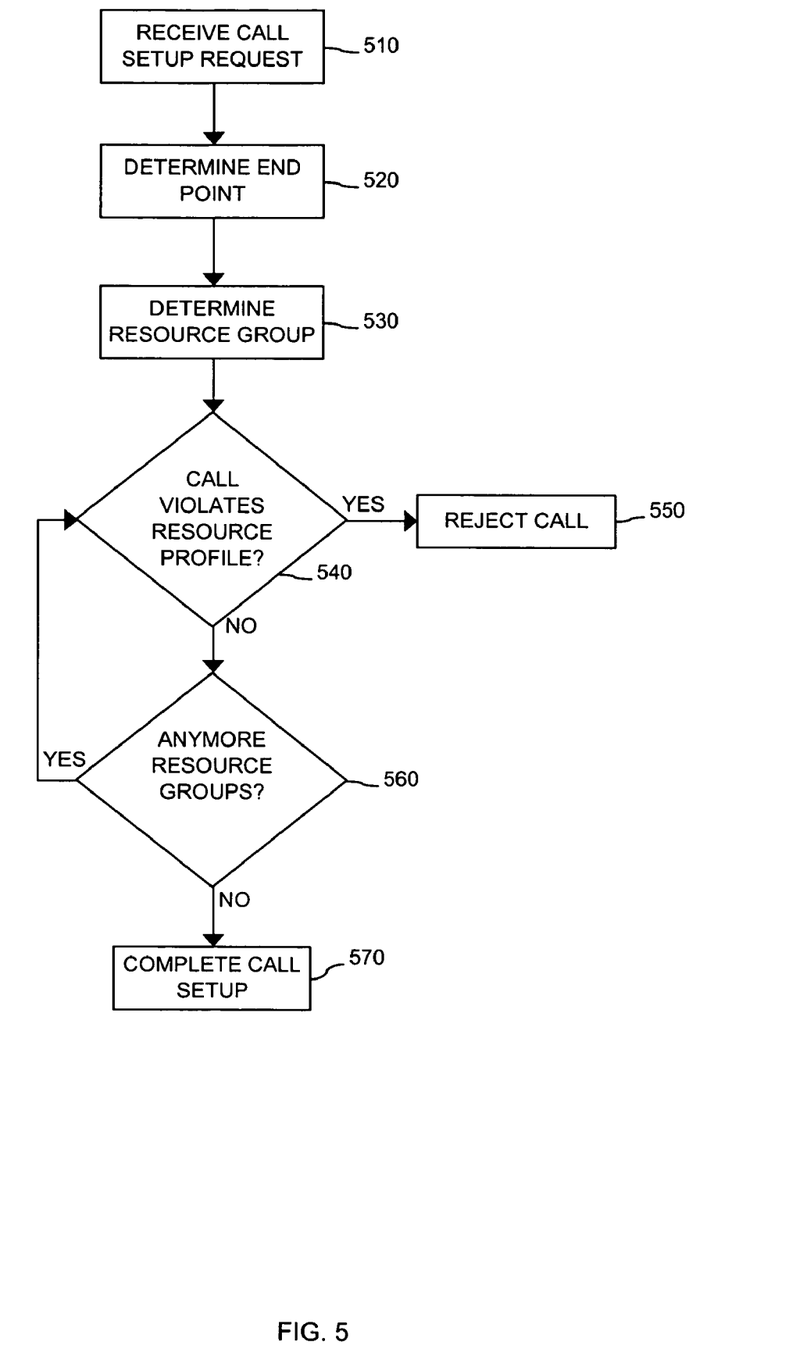
FIG. 5 illustrates the operation of a communication network in an embodiment of the invention.

FIG. 5 illustrates the operation of communication network 400 in an embodiment of the invention. To begin, call controller 412 receives a VoP call setup request (Step 510). Such a request could be in the form of a session initiation protocol (SIP) message or an H.323 setup message, as well as in other forms. Based on the request message, call controller 412 determines an end point for the session (Step 520). In this example, it is assumed that end user 451 is an end point for the call. Next, call controller 412 determines a resource group associated with the selected end point (Step 530).

Any particular end point could be associated with one or more resource groups. Each resource group could have one or more profiles. In this example, the path to be used for the session from end user 451 to service provider 410 follows link 401, link 403, and link 406 through routers 422 and 421. A first resource group for end user 451 would therefore be link 401. A second resource group for end user 451 would be link 403. A third resource group for end user 451 would be link 406.

The first resource group would have a profile of the bandwidth requirements of link 401. The profile could indicate a maximum amount of calls allowed on link 401 using a particular codec type. Another profile for the same resource group could indicate a combination of two or more maximum numbers of calls using two or more types of codecs. Another profile for the same resource group could indicate a maximum weight allowed for the link. The maximum weight could be determined by allocating a weight for each type of codec. Depending upon the current utilization of the link, adding a new weight to the current weight could be allowed under the maximum weight. The other remaining resource groups would also have profiles as illustrated for the first resource group.

Upon determining the resource group, call controller 412 accesses the current profile for that resource group. Upon accessing the profile, call controller 412 determines whether or not the requested session would violate the resource profile if the session were to be setup (Step 540). If yes, the session is rejected (Step 550). If not, call controller 412 further processes the request message to determine if there are anymore resource groups associated with the end point (Step 560). If so, Step 440 is repeated for the next resource group and its current profile. If not, the session setup process is completed (Step 570). The above illustrated steps could be performed in a different order than that described.

Figure 6:
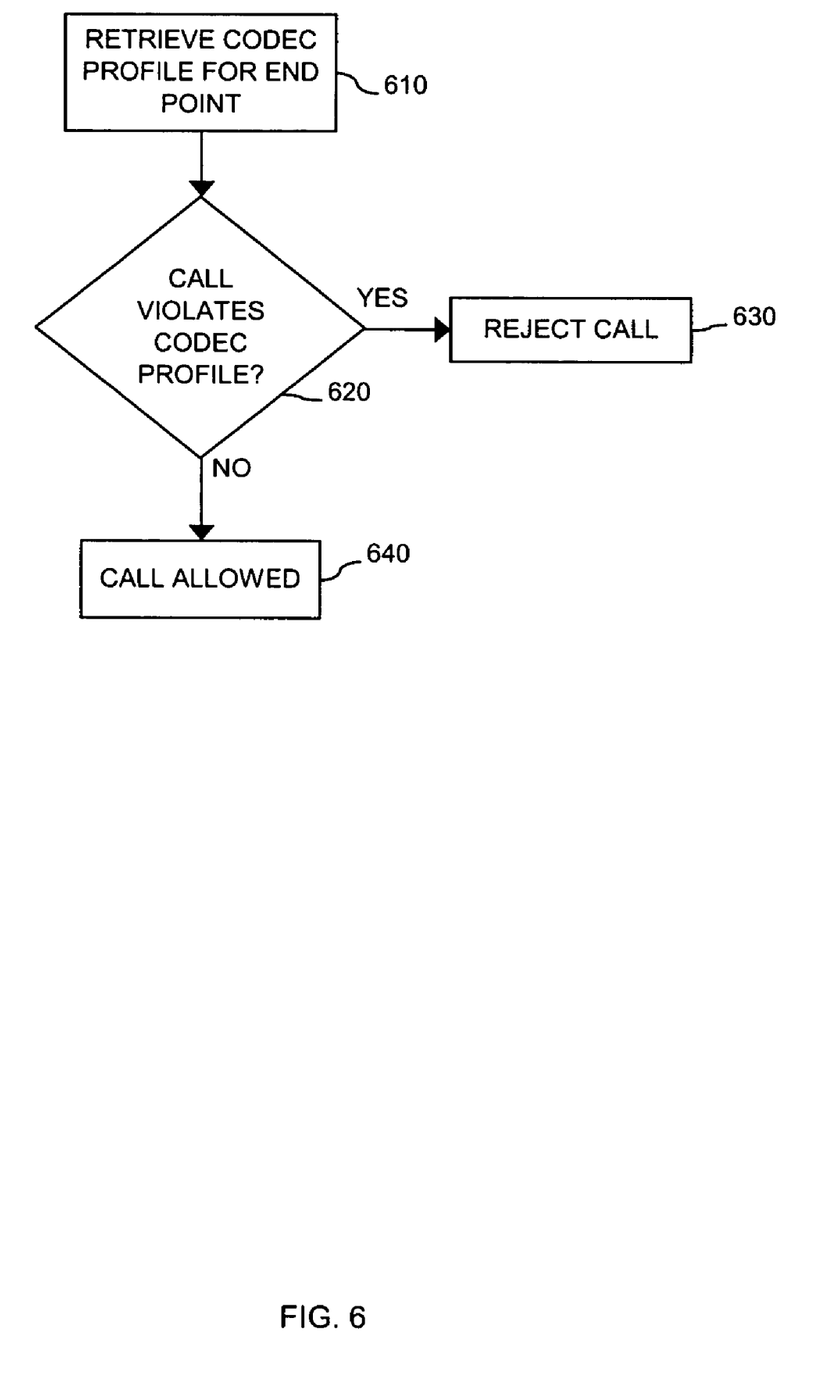
FIG. 6 illustrates the operation of a communication network in an embodiment of the invention.

FIG. 6 further illustrates the operation of communication network 400 in an embodiment of the invention. At Step 540 in FIG. 5, call controller 412 accesses the current profile for the resource group. The profile could be a codec profile for the resource group. In such as case, call controller 412 retrieves the codec profile (Step 610). Next, call controller 412 determines whether or not the call violates the codec profile (Step 620). The codec profile could describe, for example, a maximum number of calls allowed over the resource group from devices using a particular codec scheme, such as G.711 or G.729. For example, 100 calls using the G.711 codec could be allowed on the resource group. If the current call is call number 101 using G.711, the call would be rejected (Step 630). If the call is less than the one-hundredth call using G.711, the call would be allowed (Step 640).

Figure 7:
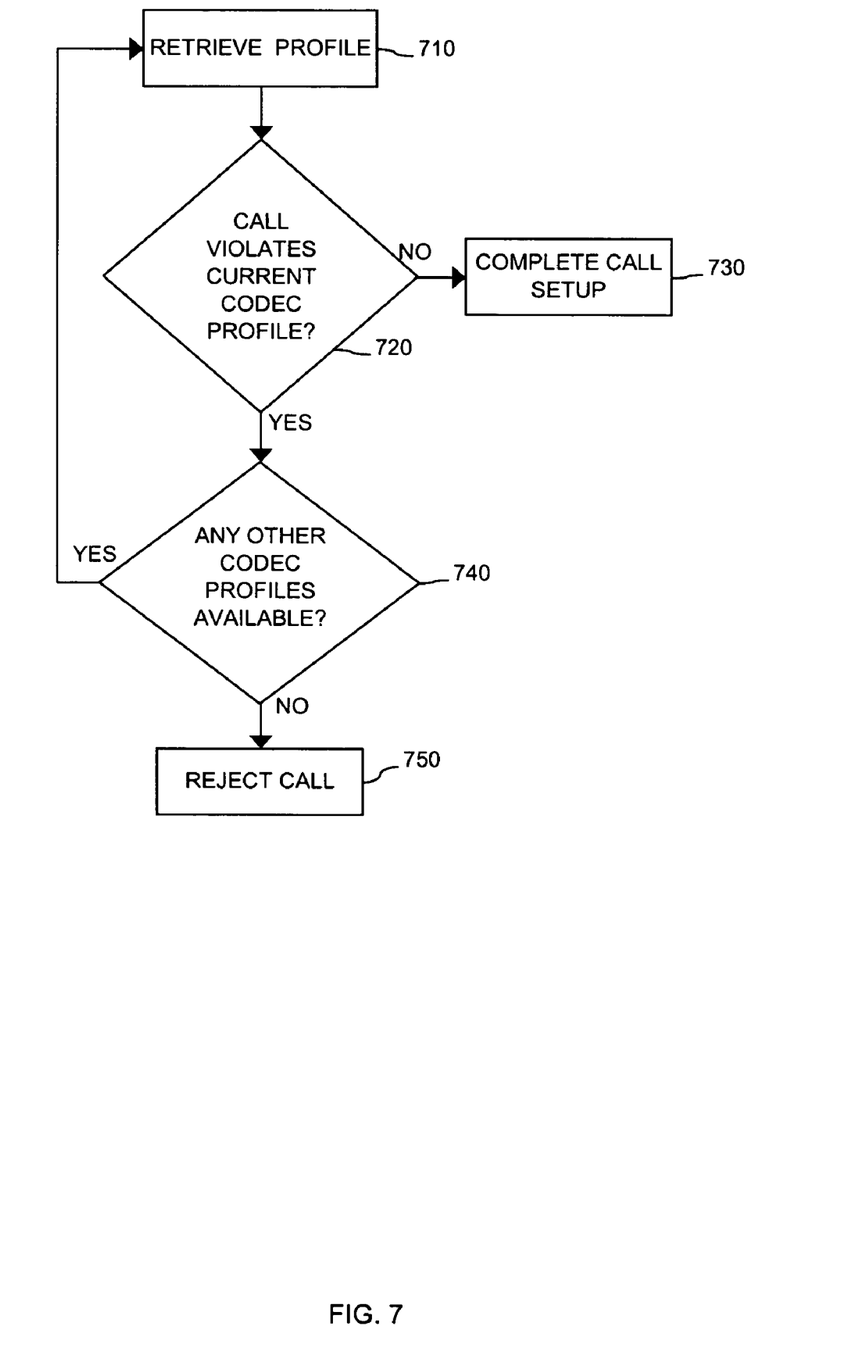
FIG. 7 illustrates the operation of a communication network in an embodiment of the invention.

FIG. 7 further illustrates the operation of communication network 400 in an embodiment of the invention. Here, a profile range is utilized. A profile range is a range of different profiles that can be applied to a resource group. To begin, call controller 412 retrieves a profile for a resource group (Step 710). Next, call controller 412 determines whether or not the call would violate the current profile for the resource group (Step 720). If not, the call can be completed (Step 730). If so, call controller 412 then determines if there are any other profiles available for the current resource group (Step 740). If so, the next profile is retrieved (Step 710). If not, the call is rejected as the current profile would be violated by the call, and no other profiles exist for the resource group (Step 750).

Figure 8:
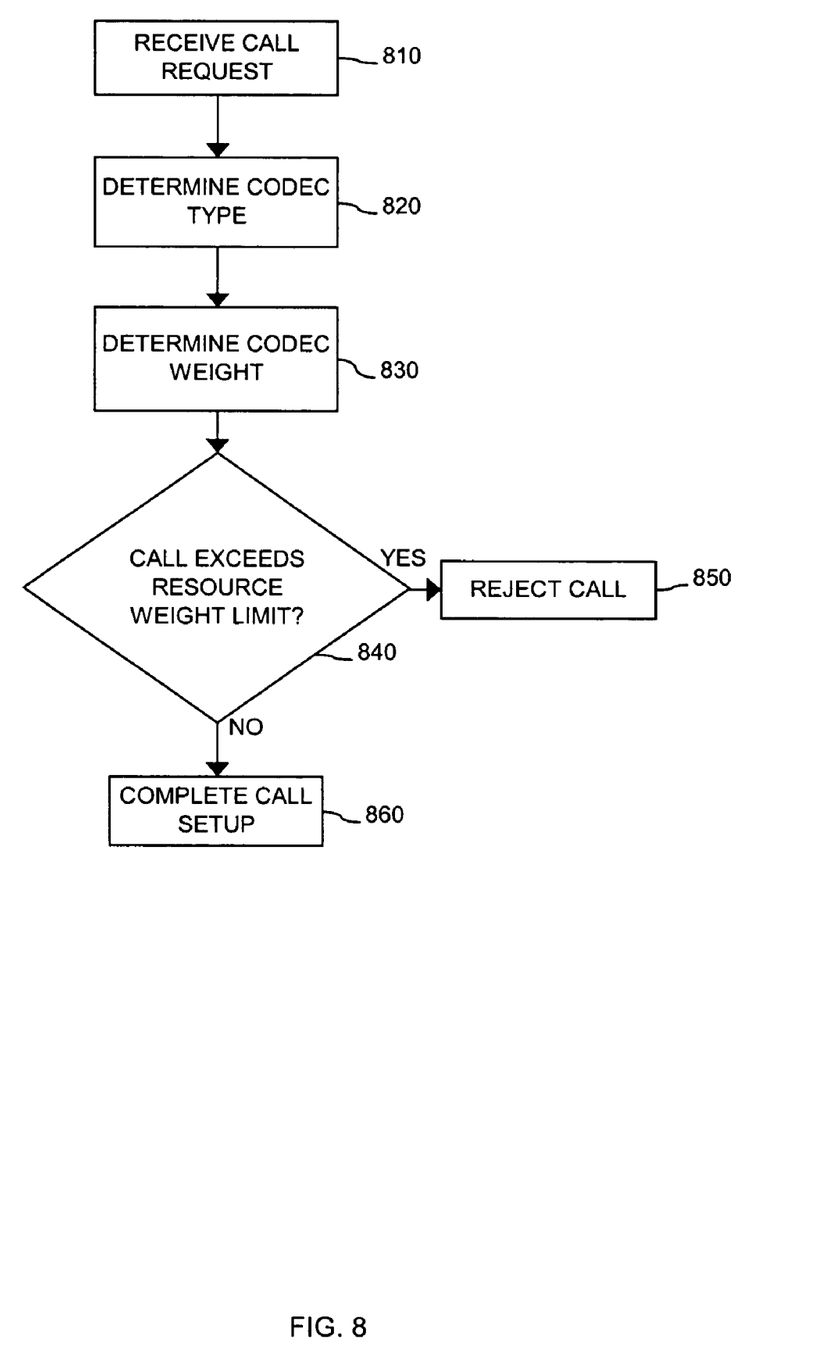
FIG. 8 illustrates the operation of a communication network in an embodiment of the invention.

FIG. 8 further illustrates the operation of communication network 400 in an embodiment of the invention. Here, a profile having a codec weight is utilized. A codec weight profiles utilizes weights for each codec type to create a ratio and normalize calls to a single unit of bandwidth utilization. The maximum number of calls is based on the normalized unit. To begin, a call setup request is received by call controller 412 (Step 810). Next, the codec for the call is determined (Step 820). A weight for the codec is determined (Step 830)

and incorporated into a determination of whether there is enough bandwidth to handle the call (Step 840). If not, the call is rejected (Step 850). If so, call setup can continue for completion of the call (Step 860).

For example, a G.729a codec could have a weight of one, and a G.711 codec could have a weight of six. This means that G.711 calls use six times the bandwidth of a G.729a call. A new G.711 call adds six to the total number of simultaneous calls, while a G.729a call adds only one. Advantageously, the codec weight profile is very efficient and flexible. In an alternative, codecs could be prioritized. Under a prioritization scheme, calls using a first type of codec could receive priority over calls using a second type of codec. The first type of codec could be, for example, more desirable than the second type.

Computer System

Figure 9:
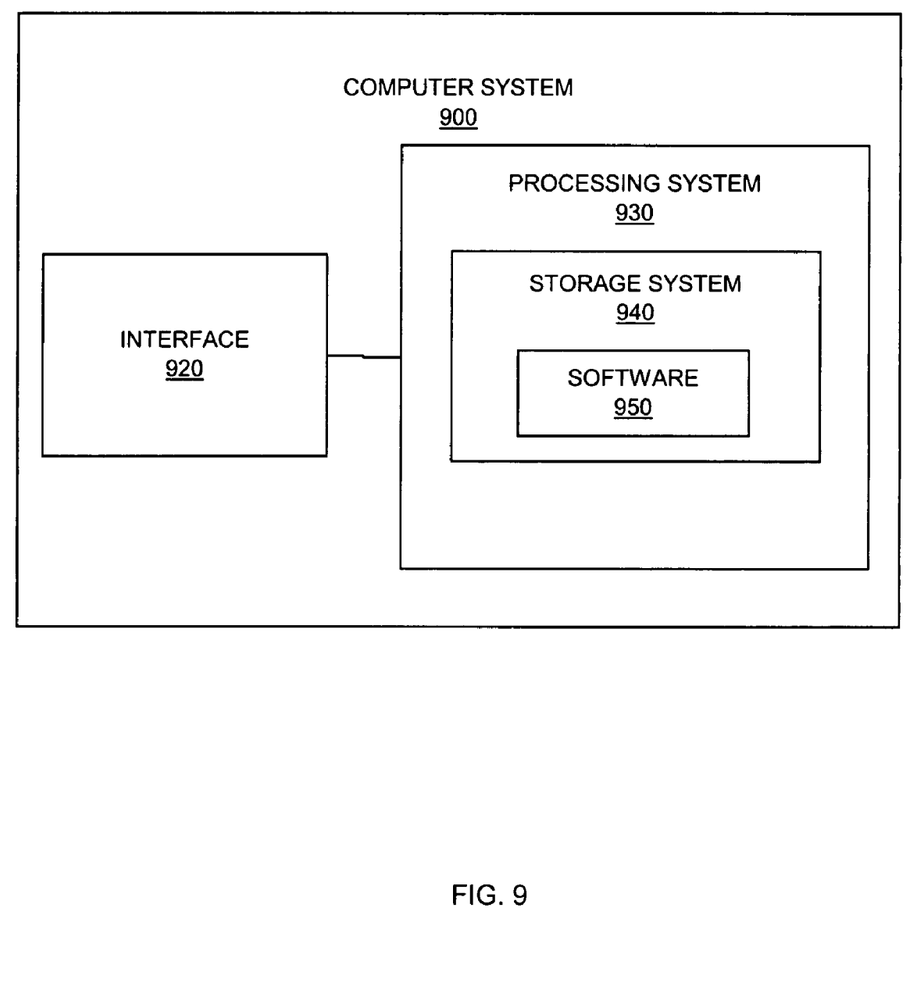
FIG. 9 illustrates a computer system in an embodiment of the invention.

FIG. 9 illustrates computer system 900 in an embodiment of the invention. Computer system 900 includes interface 920, processing system 930, storage system 940, and software 950. Storage system 940 stores software 950. Processing system 930 is linked to interface 920. Computer system 900 could be comprised of a programmed general-purpose computer, although those skilled in the art will appreciate that programmable or special purpose circuitry and equipment may be used. Computer system 900 may use a client server architecture where operations are distributed among a server system and client devices that together comprise elements 920-950.

Interface 920 could comprise a network interface card, modem, port, or some other communication device. Signaling interface 920 may be distributed among multiple communication devices. Interface 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 may be distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described for communication system 100 and call controller 412. Also when executed by the processing system 930, software 950 directs processing system 930 to operate as described for communication networks 100 and 400.

What is claimed is:

1. A method of operating a communication system for providing packet services, the method comprising:

receiving a session setup request for a communication session;

processing the session setup request to select an end point for the communication session;

determining a first communication link of a plurality of communication links associated with the end point, wherein the plurality of communication links form a communication path that provides packet services to the end point;

determining a first profile of a first plurality of profiles of the first communication link;

determining a first codec type associated with the end point;

assigning a first weight to the first codec type;

determining if the sum of the first weight and at least a current weight for the first profile of the first plurality of profiles exceeds a total weight allowed for the first profile of the first plurality of profiles; and generating a first authorization message for the communication session in response to determining that the communication session will not violate the first profile of the first plurality of profiles.

2. The method of claim 1 further comprising rejecting the communication session if the communication session will violate the first profile of the first plurality of profiles.

3. The method of claim 1 further comprising transmitting the first authorization message to the end point.

4. The method of claim 1 further comprising determining a second profile of the first plurality of profiles of the first communication link in response to determining that the sum of the first weight and at least a current weight for the first profile of the first plurality of profiles exceeds a total weight allowed for the first profile of the first plurality of profiles.

5. The method of claim 4 further comprising completing session setup for the communication session in response to determining that the communication session will not violate the second profile of the first plurality of profiles.

6. The method of claim 1 further comprising determining a second communication link of the plurality of communication links associated with the end point, determining a first profile of a second plurality of profiles of the second communication link, determining if the communication session will violate the first profile of the second plurality of profiles, and generating a second authorization message for the communication session in response to determining that the communication session will not violate the first profile of the second plurality of profiles.

7. The method of claim 1 wherein determining if the communication session will violate the first profile of the first plurality of profiles comprises determining if adding the communication session to the first communication link will exceed a first number of communication sessions allocated for a first codec type within the first profile of the first plurality of profiles wherein the first codec type is associated with the end point.

8. A communication system for providing packet services, the communication system comprising:

an interface configured to receive a session setup request for a communication session; and a processing system configured to process the session setup request to select an end point for the communication session, determine a first communication link of a plurality of communication links associated with the end point, wherein the plurality of communication links form a communication path that provides packet services to the end point, determine a first profile of a first plurality of profiles of the first communication link, determine a first codec type associated with the end point, assign a first weight to the first codec type, determine if the sum of the first weight and at least a current weight for the first profile of the first plurality of profiles exceeds a total weight allowed for the first profile of the first plurality of profiles, and generate a first authorization message for the communication session in response to determining that the communication session will not violate the first profile of the first plurality of profiles.

9. The communication system of claim 8 wherein the processing system is further configured to reject the communication session if the communication session will violate the first profile of the first plurality of profiles.

10. The communication system of claim 8 wherein the interface is further configured to transmit the first authorization message to the end point.

11. The communication system of claim 8 wherein the processing system is further configured to determine a second profile of the first plurality of profiles of the first communication link in response to determining that the sum of the first weight and at least a current weight for the first profile of the first plurality of profiles exceeds a total weight allowed for the first profile of the first plurality of profiles.

12. The communication system of claim 11 wherein the processing system is further configured to complete session setup for the communication session in response to determining that the communication session will not violate the second profile of the first plurality of profiles.

13. The communication system of claim 8 wherein the processing system is further configured to determine a second communication link of the plurality of communication links associated with the end point, determine a first profile of a second plurality of profiles of the second communication link, determine if the communication session will violate the first profile of the second plurality of profiles, and generate a second authorization message for the communication session in response to determining that the communication session will not violate the first profile of the second plurality of profiles.

14. The communication system of claim 8 wherein the processing system is further configured to determine if adding the communication session to the first communication link will exceed a first number of communication sessions allocated for a first codec type within the first profile of the first plurality of profiles wherein the first codec type is associated with the end point.

15. A computer readable medium including a software product having instructions stored thereon for operating a communication system providing packet services, the instructions operational when executed by a computer to:
 direct a processor to receive a session setup request for a communication session, process the session setup request to select an end point for the communication session, determine a first communication link of a plurality of communication links associated with the end point, wherein the plurality of communication links form a communication path that provides packet services to the end point, determine a first profile of a first plurality of profiles of the communication link, determine a first codec type associated with the end point, assign a first weight to the first codec type, determine if the sum of the first weight and at least a current weight for the first profile of the first plurality of profiles exceeds a total weight allowed for the first profile of the first plurality of profiles, and generate a first authorization message for the communication session in response to determining that the communication session will not violate the first profile of the first plurality of profiles.

\* \* \* \* \*